US008448825B2

(12) United States Patent
Mitrovic et al.

(10) Patent No.: US 8,448,825 B2
(45) Date of Patent: May 28, 2013

(54) DISPENSING DEVICE

(75) Inventors: Zoran Mitrovic, Bronschhofen (CH); Christian Hefele, Breitenbrunn (DE); Hans Peter Lederle, Durach (DE)

(73) Assignee: Hilti Aktiengesellschaft, Schaan (LI)

( * ) Notice: Subject to any disclaimer, the term of this patent is extended or adjusted under 35 U.S.C. 154(b) by 279 days.

(21) Appl. No.: 12/807,976

(22) Filed: Sep. 17, 2010

(65) Prior Publication Data

US 2011/0068130 A1 Mar. 24, 2011

(30) Foreign Application Priority Data

Sep. 18, 2009 (DE) ......................... 10 2009 041 825

(51) Int. Cl.
*G01F 11/00* (2006.01)
*B67D 7/70* (2010.01)

(52) U.S. Cl.
USPC ........... 222/333; 222/390; 222/571; 222/386; 222/262; 425/376.1

(58) Field of Classification Search
USPC . 222/333, 137, 327, 390, 571, 386; 74/10.52, 74/52, 575, 576, 577 R, 578
See application file for complete search history.

(56) References Cited

U.S. PATENT DOCUMENTS 4,583,934 A * 4/1986 Hata et al. .................. 425/376.1
4,615,469 A * 10/1986 Kishi et al. .................... 222/327
4,669,636 A * 6/1987 Miyata ..................... 222/153.01
5,370,282 A 12/1994 Sedlmeier ................. 425/376 R
5,775,539 A * 7/1998 Bates et al. ....................... 222/1
5,909,830 A * 6/1999 Bates et al. .................. 222/327
6,123,235 A * 9/2000 Hsu ............................. 222/327
6,540,113 B2 * 4/2003 Gardos ......................... 222/137
6,889,872 B2 * 5/2005 Herman et al. ................. 222/82
7,004,357 B2 * 2/2006 Shew ........................... 222/256
7,249,695 B2 * 7/2007 Shew ........................... 222/333
7,282,880 B2 * 10/2007 Glasgow et al. .............. 318/280
7,420,341 B2 * 9/2008 Glasgow et al. .............. 318/280
7,523,843 B2 * 4/2009 Shew et al. ................... 222/262
7,584,871 B2 * 9/2009 Huang et al. .................. 222/263

(Continued)

FOREIGN PATENT DOCUMENTS

DE 34 28 202 A1 2/1985

*Primary Examiner* — Kevin P Shaver
*Assistant Examiner* — Michael Melaragno
(74) *Attorney, Agent, or Firm* — Davidson, Davidson & Kappel, LLC

(57) ABSTRACT

The invention relates to a dispensing device (11) for containers (33) containing a compound, comprising a compartment (12) for the container, with a piston rod (13) that can be moved relative to the compartment (12), with an extruding device (16) that comprises a drive wheel (21) for advancing the piston rod (13), a motor (22) for driving the drive wheel (21) as well as a planetary gear (23) that is interposed between the drive wheel (21) and the motor (22) and that has a gear rotational axis (24) and a ring gear (25). The ring gear (25) is provided with multiple recesses that are located along its circumference at intervals from each other. Moreover, the dispensing device (11) has an actuating switch (31) for actuating the motor (22) and a blocking element (36) that can be moved from a blocking position that blocks the ring gear (25) into a releasing position that releases this ring gear (25). A separate unlocking switch (41) is provided for actuating the blocking element (36), and the blocking element (36) can be pivoted around a pivot axis (37) in order to be moved from the blocking position into the releasing position.

10 Claims, 2 Drawing Sheets

U.S. PATENT DOCUMENTS 7,637,392 B2 * 12/2009 Hsu et al. ...................... 222/137
7,690,530 B2 * 4/2010 Schneider et al. .............. 222/63
7,854,348 B2 * 12/2010 Wang .............................. 222/63
7,971,758 B2 * 7/2011 Campbell et al. ............. 222/391
7,997,456 B2 * 8/2011 Shew et al. ................... 222/333
8,011,538 B2 * 9/2011 Herman et al. ............... 222/326
8,020,727 B2 * 9/2011 Herman et al. ................... 222/1

* cited by examiner

DISPENSING DEVICE

This claims the benefit of German Patent Application No. 10 2009 041 825.3, filed Sep. 18, 2009 and hereby incorporated by reference herein.

The present invention relates to a dispensing device for containers containing a compound.

BACKGROUND INFORMATION

Such a dispensing device makes it possible for compounds, such as mortar compounds or sealing compounds packaged in containers, to be dispensed at an application place. Containers encompass, for example, cartridges having one or more compartments for one or more components of the compound to be extruded, which is/are either contained directly in the compartments of the cartridge or else packaged, for example, in a foil pack. The term "container" also encompasses foil packs filled with one or more components of the compound to be extruded, said foil packs being inserted into a separate holder or into a holder arranged on the dispensing device.

German patent application DE 34 28 202 A1 discloses a dispensing device for containers containing a compound, comprising a piston rod that can be moved with respect to the compartment, and an extruding device. The extruding device comprises a drive wheel for advancing the piston rod, a motor for driving the drive wheel as well as a planetary gear that is interposed between the drive wheel and the motor and that has a gear rotational axis and a ring gear having multiple recesses that are located along its circumference at intervals from each other. Moreover, there is an actuating switch for actuating the motor. There is also a blocking element for the ring gear, which can be moved from a blocking position that blocks the ring gear of the planetary gear into a releasing position that releases this ring gear.

When the actuating switch is activated, the motor is actuated, for instance, by means of an appropriate control unit or by being directly energized. In this process, the planetary gear causes the drive wheel to rotate, and the piston rod is advanced by a prescribed value. With each advancing movement of the piston rod, a corresponding quantity of the compound is extruded through a dispensing opening. When the actuating switch is actuated, the blocking element that is directly connected to the actuating switch is simultaneously moved into the releasing position along a linear guide link. When the actuating switch is in the non-actuated state, the blocking element is in the blocking position in which the ring gear is blocked and in which the piston rod can be moved into its initial position, for example, in order to insert a new container or a different container into the compartment.

SUMMARY OF THE INVENTION

A drawback of the prior-art approach is that the drive assembly is laborious to construct and that the blocking element calls for a large installation space inside the dispensing device.

One objective of the invention is to create a dispensing device for containers containing a compound which does not entail the above-mentioned disadvantages and especially which allows the at least one piston rod to be easily returned to its initial position.

According to the invention, a separate unlocking switch is provided for actuating the blocking element, and the blocking element can be pivoted around a pivot axis in order to be moved from the blocking position into the releasing position.

The pivoting blocking element considerably reduces the required installation space in comparison to a blocking element that can be moved linearly, which allows a dispensing device to be configured so as to be compact and easy to handle. In this context, the blocking element can be readily moved from the blocking position into the releasing position and vice versa. Moreover, the pivoting blocking element is provided with a force-reduction means which ensures that the blocking element is easy to actuate during the use of the dispensing device, something which can hardly or not at all be implemented in a blocking element that can be moved axially.

In the blocking position of the blocking element, part of said element engages with one of the recesses of the ring gear and locks it, so that the rotation of the ring gear is blocked. In the releasing position, the corresponding part of the blocking element lies outside of the recesses of the ring gear and the latter can turn freely. The drive assembly of the extruding device is configured in such a way that the at least one piston rod can be easily moved manually relative to the compartment in the releasing position of the blocking element.

The unlocking switch for the blocking element can be actuated independently of the actuating switch. Consequently, the actuating switch can be a potentiometer switch that activates the motor on the basis of the actuated path of the actuating switch. This type of actuating switch makes it possible to dispense extruded amounts of the compound contained in the container in a manner that is metered by the user. If the blocking element is coupled directly to the actuating switch, as is the case with the dispensing device according to German patent application DE 34 28 202 A1, the actuating switch has to be actuated completely in order to move the blocking element from the blocking position into the releasing position.

The planetary gear is advantageously a reduction gear and is also advantageously configured in several stages. The advantageous several stages of the planetary gear are arranged coaxially with respect to each other, for example, on a rotational gear axis, which allows the drive assembly to have a simple and compact configuration.

Advantageously, the unlocking switch and the blocking element are two separate elements that can be operatively connected for purposes of actuating the blocking element whenever necessary. This two-part configuration makes it possible to produce this part with simple and thus economical shapes, and also simplifies the replacement of the element in question if it has become worn out after prolonged use. As an alternative, the unlocking switch and the blocking element form a joint element.

Preferably, the pivot axis of the blocking element runs crosswise to the rotational axis of the planetary gear, as a result of which the blocking element can be arranged in a particularly space-saving manner in order to be pivoted into and out of the recesses of the ring gear. Advantageously, the pivot axis runs perpendicular to a plane that contains the gear rotational axis.

Preferably, the dispensing device has a housing, and the actuating switch for actuating the motor is located on a side of the housing of the dispensing device facing the compartment, while the unlocking switch is located on a side of the housing facing away from the compartment. The side of the housing facing the compartment is, for instance, part of a handle of the dispensing device that advantageously extends essentially perpendicular to the lengthwise extension of the at least one piston rod or to the dispensing device. In such an arrangement, the actuating switch can advantageously be actuated with the index finger and/or the middle finger, whereby the unlocking switch can be actuated with the thumb of the same hand. This makes the dispensing device particularly easy to use and handle.

Preferably, the blocking element is spring-loaded by a spring element, as a result of which the blocking element is automatically forced into the preferred position. Advantageously, the blocking element is spring-loaded in such a way that it is in the blocking position when the actuating switch is in the non-actuated state. The spring element is advantageously a coil spring and particularly advantageously, it is a helical compression spring. Starting from the pivot axis, the blocking element advantageously extends in two directions that are essentially opposite from each other, whereby part of the blocking element forms the engagement part that can penetrate into the recesses of the ring gear, while the other part forms an actuating part having an engagement surface for the spring element, and, also advantageously, having an engagement surface for the unlocking switch.

Preferably, the recesses along the circumference of the ring gear are grooves with side walls that are parallel to each other, as a result of which the ring gear is blocked in both directions of rotation when the blocking element is in its blocking position.

In addition to or as an alternative to this, the recesses along the circumference of the ring gear are grooves that, with respect to the circumference of the ring gear, have a bottom part whose depth, starting from an initial depth, decreases towards the circumference, as a result of which the ring gear is blocked in a corresponding direction of rotation when the blocking element is in its blocking position, while in the other direction of rotation, the blocking element can be automatically uncoupled. Advantageously, the bottom section with the decreasing depth tapers towards the circumference of the ring gear, as a result of which the grooves do not have a side wall on one side. When the ring gear is thus configured, it is advantageously arranged in such a way that the at least one piston rod can be manually advanced in one rotational direction of the ring gear without actuating the blocking element, for example, in order to effectuate a quick advancing movement for purposes of changing over to a half-full container or for transporting the dispensing device.

BRIEF DESCRIPTION OF THE DRAWINGS

The invention will be elaborated in greater detail below on the basis of embodiments. The following is shown.

Fundamentally speaking, identical parts are designated by the same reference numerals in the figures.

DETAILED DESCRIPTION OF THE EMBODIMENTS

Figure 1:
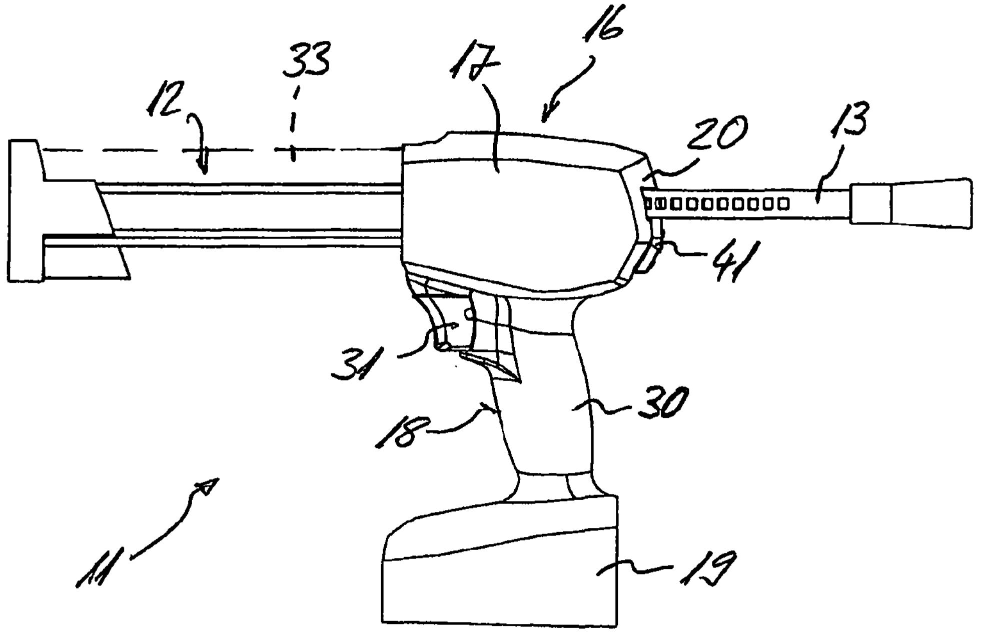
FIG. 1—a side view of a dispensing device.
Figure 4:
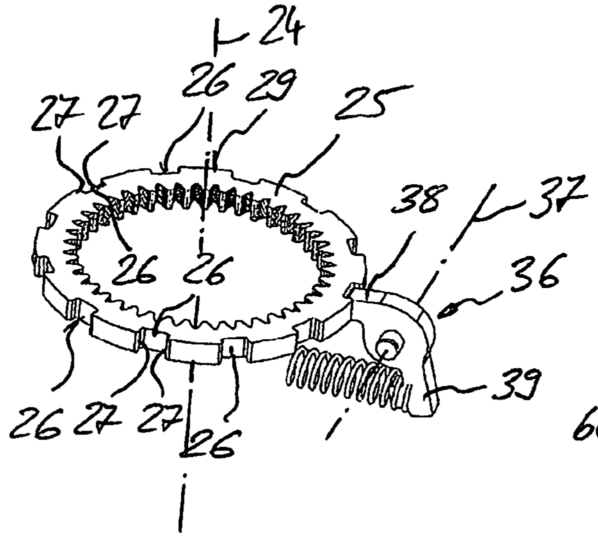
FIG. 4—a perspective view of the ring gear of the extruding device, with the blocking element in the blocking position.

The dispensing device 11 for containers 33 containing a compound as shown in FIGS. 1 to 4 comprises a compartment 12 for the container 33, a perforated piston rod 13 that can be moved relative to the compartment 12, and an electrically actuatable extruding device 16. A pressure piston 14 that acts on the container 33 or on the compound contained in it is provided on the end of the piston rod 13 facing the compartment 12.

The extruding device 16 is arranged in a housing 17 from which a handle 30 extends that has a housing side 18 facing the compartment 12. A battery pack 19 is detachably affixed to the free end of the handle 30.

The extruding device 16 comprises a toothed wheel 21 (FIGS. 2 and 3) whose teeth intermesh with the perforations in the piston rod 13 in order to advance it. Furthermore, the extruding device 16 comprises a motor 22 for driving the drive wheel 21 as well as a multi-stage planetary gear 23 interposed between the drive wheel 21 and the motor 22. The planetary gear 23 has a rotational axis 24 and, along with additional gear components such as sun gears and planet gears, it also has a ring gear 25. The circumference 29 of the ring gear 25 has several recesses 26 positioned at a distance from each other. The recesses 26 along the circumference 29 of the ring gear 25 are grooves having side walls 27 that run parallel to each other.

Furthermore, a blocking element 36 is provided that can be pivoted around a pivot axis 37 from a blocking position (FIG. 2) that blocks the ring gear 25 of the planetary gear 23 into a releasing position (FIG. 3) that releases said ring gear 25. The pivot axis 37 of the blocking element 36 runs crosswise to the rotational axis 24 of the planetary gear 23. In order to actuate the blocking element 36, a separate unlocking switch 41 is provided that is pivotably affixed to the housing 17 by means of a joint 42.

On the side 18 of the housing 17 facing the compartment 12, there is a potentiometer switch that serves as an actuating switch 31 for actuating the motor 22. The unlocking switch 41 is arranged on the side 20 of the housing 17 facing away from the compartment 12. In this example, the unlocking switch 41 is arranged on the rear end of the housing 17 with respect to the extruding direction of the dispensing device 11.

The blocking element 36 extends in two opposite directions with respect to the pivot axis, whereby one part forms an engagement part 38 that engages with the recesses 26 of the ring gear 25, while the other part forms the actuating part 39 of the blocking element 36. Between a housing part 28 of the planetary gear 23 and the actuating part 39 of the blocking element 36, a helical compression spring is provided as the spring element 46 that spring-loads the blocking element 36 and forces it into its blocking position as the preferred position of the blocking element 36.

When the actuating switch 31 is actuated, the motor 22 is supplied with current from the battery pack 19 and is activated by means of a control unit not shown here. The control unit is set in such a way that the motor 22 is only energized for a certain period of time. The motor 22 causes the components of the planetary gear 23 to rotate, whereby the ring gear 25 is locked by means of the blocking element 36. As a result, the torque generated by the motor 22 is transferred to the drive wheel 21 which, in turn, moves the piston rod 13 by the corresponding value in the direction of the compartment 12. This procedure is continuously repeated until the desired quantity of the compound contained in the container 33 has been extruded.

The unlocking switch 41 is actuated in order to switch or replace an empty or partially empty container 33. In this process, the blocking element 36 is pivoted around the pivot axis 37 against the spring force of the spring element 46 and moved into its releasing position (FIG. 3) in which the ring gear 25 can rotate freely. In the releasing position of the blocking element 36, in spite of the fact that the drive wheel 21 is constantly engaged with the piston rod 13, the piston rod 13 can be manually retracted or advanced since it idles and rotates along due to the now freely rotatable ring gear 25. After the unlocking switch 41 has been relieved, the blocking element 36 is forced back into its blocking position (FIG. 2) by the spring element 46. The container 33 can now be removed from the compartment 12 of the dispensing device 11.

After the new container has been inserted into the compartment 12, the unlocking switch 41 is actuated once again and held in the depressed position, so that the piston rod 13 can be advanced until it makes contact with the container or with the compound that is to be extruded. Once the unlocking switch 41 has been relieved, the blocking element 36 returns to its blocking position (FIG. 2) and locks the ring gear 25 once again. When the actuating switch 31 is actuated, the torque of the motor 22 is transferred once again via the planetary gear 23 to the drive wheel 21, and the compound contained in the new container can be extruded.

As an alternative to this, the actuating switch 31 can be actuated directly after the new container has been placed into the compartment 12, so that the piston rod 13 is advanced by the motor 22 until it comes into contact with the container or with the compound that is to be extruded.

Figure 5:
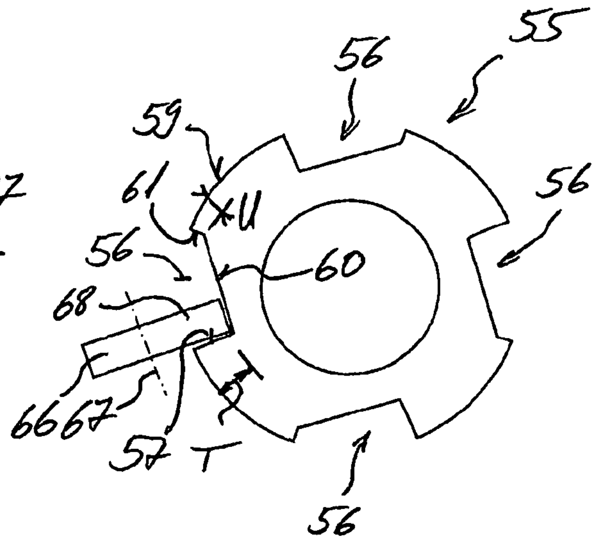
FIG. 5—a plan view of a second embodiment of a ring gear, with the blocking element in the blocking position.
Figure 2:
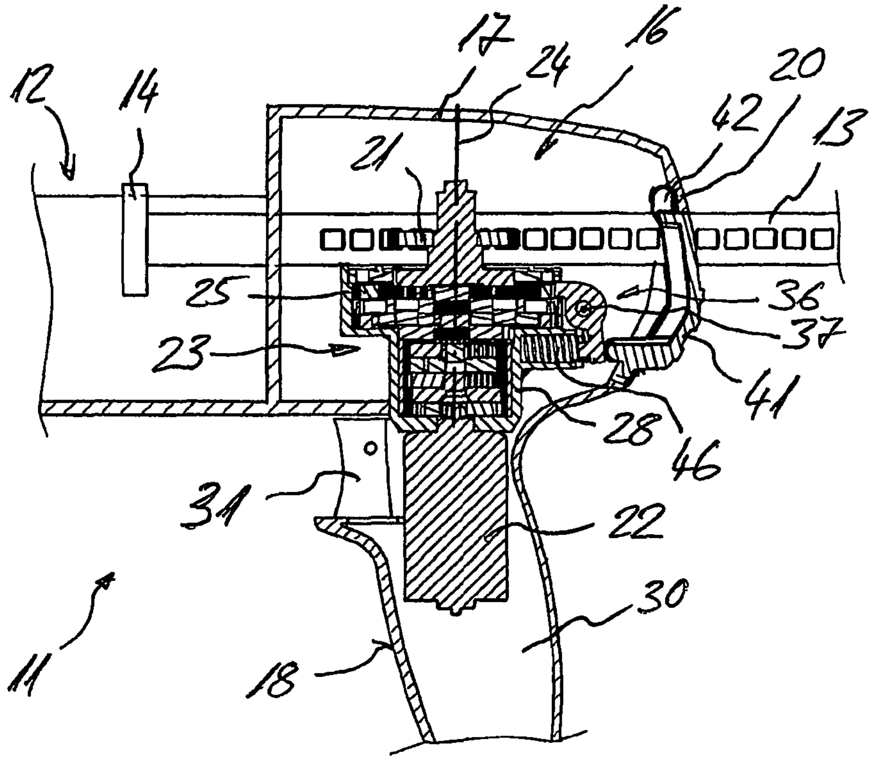
FIG. 2—a partial section through the extruding device, parallel to the lengthwise extension of the piston rod, with the blocking element in the blocking position.
Figure 3:
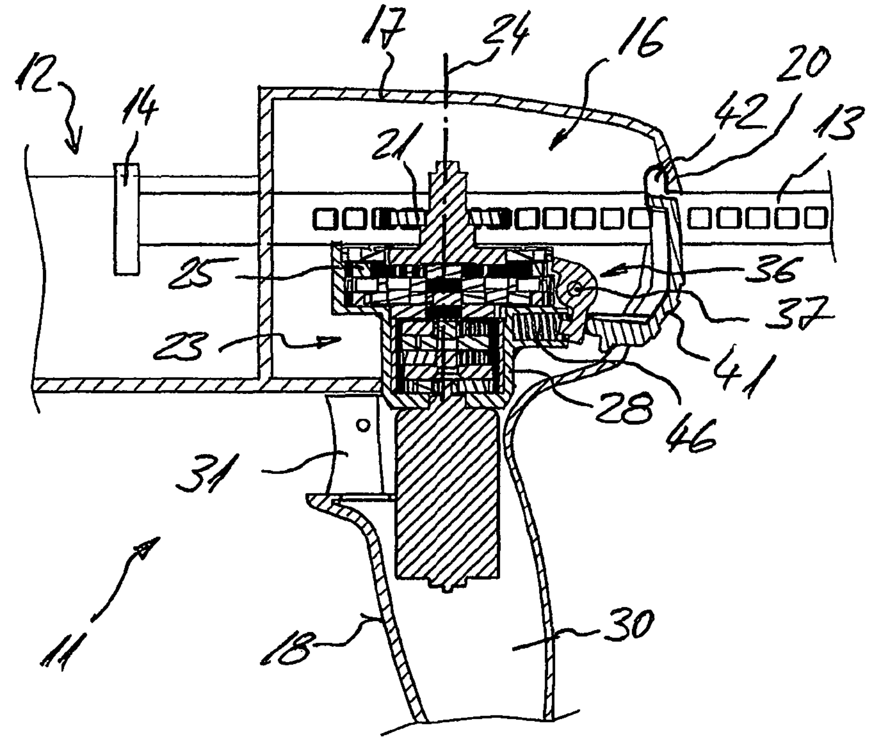
FIG. 3—a partial section through the extruding device according to FIG. 2, with the blocking element in the releasing position.

The ring gear 55 shown in FIG. 5 likewise has several recesses 56 that are located along its circumference at intervals from each other and that are configured as grooves. These recesses 56 each have a bottom section 60 whose depth U, starting from an initial depth T, decreases towards the circumference 59 of the ring gear 55. The bottom section 60 of the recesses 56 runs in the form of a ramp. Therefore, the recesses 56 have two side walls 57 and 61 of different lengths, whereby the side wall 61 is smaller than the side wall 57. In an alternative embodiment, the bottom section with the decreasing depth tapers towards the circumference 59 of the ring gear 55, so that the recesses configured as grooves each have only one side wall 57.

In the blocking position shown, the engagement part 68 of the blocking element 66 that can be pivoted around the pivot axis 67 is in contact with the side wall 57 of the recess 56 in order to lock the ring gear 55.

What is claimed is:

1. A dispensing device for a container containing a compound, comprising:

a compartment for the container;

at least one piston rod movable relative to the compartment;

an extruding device including a drive wheel for advancing the at least one piston rod, a motor for driving the drive wheel, and a planetary gear interposed between the drive wheel and the motor, the planetary gear having a gear rotational axis and at least one ring gear, the at least one ring gear having multiple recesses located along a circumference at intervals from each other;

an actuating switch for actuating the motor;

a blocking element movable from a blocking position blocking the ring gear into a releasing position releasing the ring gear; and a separate unlocking switch for actuating the blocking element, the blocking element being pivotable around a pivot axis in order to be moved from the blocking position into the releasing position;

the pivot axis of the blocking element running crosswise to the gear rotational axis of the planetary gear.

2. The dispensing device as recited in claim 1 further comprising a housing, the actuating switch for actuating the motor being located on a side of the housing facing the compartment, the unlocking switch being located on a further side of the housing facing away from the compartment.

3. The dispensing device as recited in claim 1 wherein the blocking element is spring-loaded by a spring element.

4. The dispensing device as recited in claim 1 wherein the recesses along the circumference of the ring gear are grooves having, with respect to the circumference of the ring gear, a bottom section with a depth, starting from an initial depth, decreasing towards the circumference.

5. The dispensing device as recited in claim 1 wherein the recesses along the circumference of the ring gear are grooves with side walls parallel to each other.

6. The dispensing device as recited in claim 5 where the side walls have different lengths.

7. The dispensing device as recited in claim 1 wherein the piston rod is a perforated piston rod.

8. The dispensing device as recited in claim 7 wherein the drive wheel is a toothed wheel interacting with the perforated piston rod.

9. The dispensing device as recited in claim 1 further comprising a battery pack supplying current to the motor.

10. The dispensing device as recited in claim 9 further comprising a handle, the battery pack detachably fixed to a free end of the handle.

* * * * *